Aug. 12, 1947.  R. W. BROWN  2,425,361
MAGNETIC TESTING APPARATUS
Filed Dec. 8, 1942
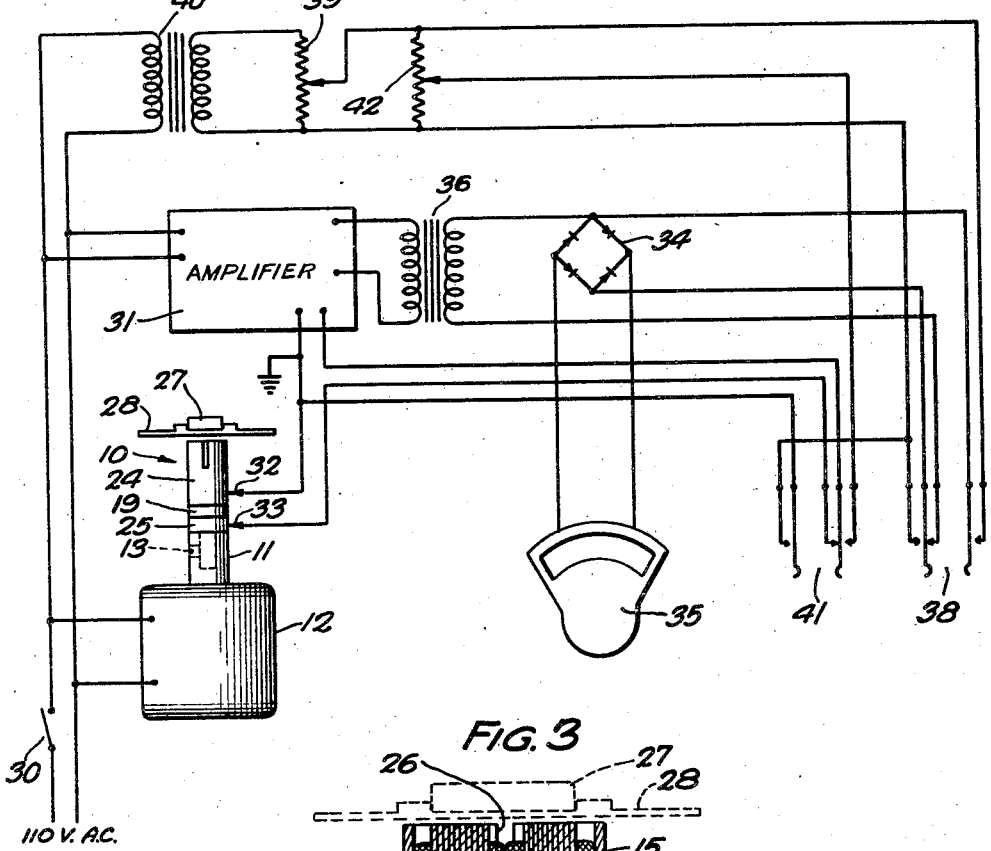
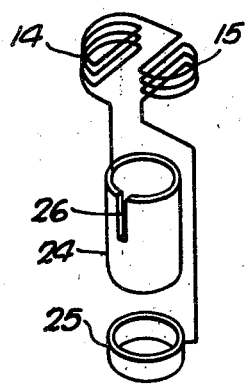
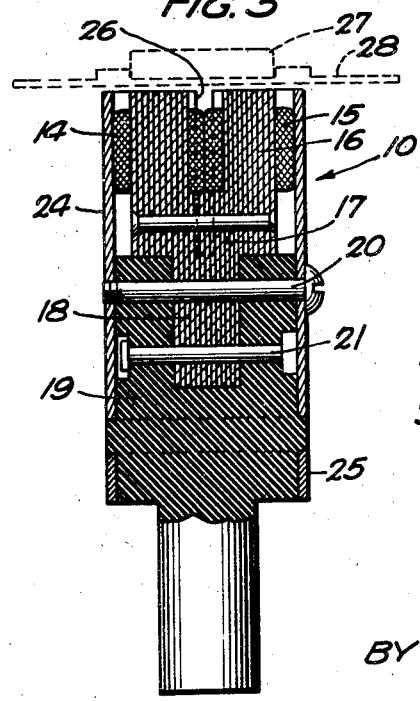
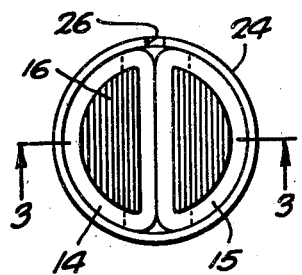
INVENTOR
R. W. BROWN
BY *Harry L. Swift*
ATTORNEY Patented Aug. 12, 1947

2,425,361

UNITED STATES PATENT OFFICE 2,425,361

MAGNETIC TESTING APPARATUS

Raymond W. Brown, Chicago, Ill., assignor to Western Electric Company, Incorporated, New York, N. Y., a corporation of New York Application December 8, 1942, Serial No. 468,241

2 Claims. (Cl. 175—183)

This invention relates to electrical testing apparatus, and more particularly to an apparatus for determining magnetic flux.

In the manufacture of certain types of communication equipment, and particularly in the manufacture of telephone receivers, it is sometimes desirable that the permanent magnets used therein be held to close tolerances as to magnetic flux. Since the flux of these magnets is sometimes relatively low, some difficulties may be experienced in accurately determining the flux.

It is an object of the present invention to provide an effective and efficient apparatus for determining magnetic flux.

In accordance with one embodiment of this invention, an apparatus for testing the magnetic flux of magnets may be provided having a pair of rotating search coils connected to a milliammeter through an amplifying circuit. A testing circuit is associated with the amplifying circuit for checking its output.

Other objects and advantages of the present invention will be more apparent from the following detailed description taken in conjunction with the accompanying drawings, wherein:

Fig. 1 is a schematic view of a circuit constructed in accordance with this invention;

Fig. 2 is a plan view of the search coil;

Fig. 3 is a sectional view along the line 3—3 of Fig. 2, and

Fig. 4 is a diagrammatic perspective view of the coils and the associated conducting rings, shown in spaced relation.

This apparatus is intended to measure the flux of small, relatively weak magnets and to provide a self-contained circuit for calibrating the apparatus. Referring now to the drawings, and particularly to Fig. 1, a rotatable search coil 10, shown in detail in Figs. 2, 3 and 4, is mounted on a shaft 11 of a constant speed electric motor 12, the coil being locked to the motor shaft by a set screw 13.

The search coil comprises a pair of coils 14 and 15 wound about a bifurcated upper portion 16 of a laminated core structure 17, the lower portion 18 of the core 17 being reduced and extending into a cylindrical block 19 of an insulating material such as phenol fiber or hard rubber. The core 17 is held in position in the block by bolts 20 and 21 which extends laterally through the block as shown.

A sleeve 24 of brass or similar conducting material is mounted around the upper portion of the block 19 and is connected, as shown in Fig. 4, to the left hand coil 14. A connector ring 25 of material similar to the sleeve 24 is mounted on the lower portion of the block 19 and is spaced from the sleeve 24. The right hand coil 15 is connected to this ring. It will be noted that the upper portion of the sleeve 24 is provided with a slot 26. By slotting the upper portion of the sleeve 24, the effect of a short circuited turn coupled to coils 14 and 15 is prevented and distortion due to eddy currents is substantially eliminated.

In the operation of this apparatus, a magnet 27 to be tested is placed on a holder 28 of fiber or other non-magnetic material and is positioned a short distance above the upper surface of the laminated core structure 17, as shown in Fig. 3. The motor 12 is then started by closing a line switch 30. Closing this switch also supplies power to an amplifier 31 of standard design provided with the usual amplification control knob 29. A pair of brushes or spring contacts 32 and 33 connected to the amplifier 31 engage the sleeve 24 and ring 25, respectively, and the current generated by rotating the coils 14 and 15 in the field of the magnet 27 being tested is passed through the amplifier 31 and then through a transformer 36 and a normally closed switch 38 to a rectifier 34 whereby the current is converted to direct current. A milliammeter 35 is connected to the rectifier and indicates the amount of amplified current flowing therethrough. By comparing the indications of the milliammeter with a standard, the flux of any particular magnet may be closely evaluated.

In the course of use, the tubes in the amplifier gradually become somewhat less efficient and other changes may also occur in the circuit which will affect the output of the amplifier. In this apparatus, however, a calibrating circuit is provided for accurately checking the amplifier output. A predetermined current is first applied to the milliammeter and the reading noted, and then a substantially smaller predetermined current is applied through the amplifier to the milliammeter. For example, a fixed current of 10 milliamperes may be applied to the milliammeter and then a current of .01 milliampere applied, 1 to 1000 being the desired amplification ratio. The amplifier is then adjusted to give the same milliammeter reading for the second as for the first current.

Referring now to Fig. 1, in calibrating the output of the amplifier 31 the switch 38 is operated to disconnect the amplifier from the milliammeter and to complete a circuit through a variable resistor 39 and step-down transformer 40 from the line supply to the milliammeter. The variable resistor 39 is adjusted to give the desired deflection on the milliammeter and the current noted. The second switch 41 is then operated to connect a second variable resistor 42, which is connected in parallel across the line as shown in Fig. 1, to the amplifier and the first switch 38 is returned to its original position. It will be understood that no magnet is placed in testing position during the calibration of the amplifier. The setting of the variable resistor 42 is previously adjusted to reduce the current applied to the amplifier to a predetermined fraction of the current applied originally through the resistor 39 directly to the milliammeter. The amplifier is then adjusted to cause the second current to give the same reading on the milliammeter as the first; the ratio of amplification will, thus, be equivalent to the quotient of the two currents. In practice, once the ratio between the two currents has been established, it is not changed and, thus, since the resistors are substantially stable, the output of the amplifier may be easily and accurately checked. The switch 41 is then returned to its original setting and the apparatus is ready for testing.

While this apparatus is intended particularly for testing magnets having relatively low flux, it will be understood that the apparatus is suitable for testing high flux magnets as well and will give extremely accurate results.

While but one embodiment of this invention has been shown and described, it will be understood that many changes and modifications may be made therein without departing from the spirit or scope of the present invention.

What is claimed is:

1. In an apparatus for testing magnets, a search coil comprising a laminated cylindrical core having a bifurcated upper portion, a coil of semi-cylindrical shape wound about each part of the core, said coils being interconnected, a block of insulating material for supporting said core, a sleeve of conducting material surrounding said core and coils serving as a shield for said coils mounted on said block and connected to one of said coils, and a ring of conducting material mounted on said block and spaced from said sleeve, said ring being connected to the other of said coils.

2. In an apparatus for testing magnets, a search coil comprising a laminated cylindrical core having a bifurcated upper portion, a coil of semi-cylindrical shape wound about each part of the core, said coils being interconnected, a block of insulating material for supporting said core, a sleeve of conducting material surrounding said core and coils serving as a shield for said coils mounted on said block and connected to one of said coils, the upper portion of said sleeve being slotted to eliminate distortion due to eddy currents, and a ring of conducting material mounted on said block and separated from said sleeve, said ring being connected to the other of said coils.

RAYMOND W. BROWN.

REFERENCES CITED

The following references are of record in the file of this patent:

UNITED STATES PATENTS

| Number | Name | Date |
|---|---|---|
| 1,801,328 | Burrows | Apr. 21, 1931 |
| 1,270,100 | Ballman | June 18, 1918 |
| 1,851,818 | Drake et al. | Mar. 29, 1932 |
| 2,036,856 | Drake | Apr. 7, 1936 |
| 1,317,786 | Hartshorn | Oct. 7, 1919 |
| 1,094,106 | White | Apr. 21, 1914 |
| 974,760 | Eastwood | Nov. 1, 1910 |
| 1,731,239 | Affel | Oct. 15, 1929 |
| 2,026,060 | Pratt | Dec. 31, 1935 |
| 2,170,515 | Dionne et al. | Aug. 22, 1939 |

OTHER REFERENCES

Magnets, by C. R. Underhill; McGraw-Hill, 1924, pp. 48–49.